A. A. UNRUH.
AUTOMOBILE BRAKE.
APPLICATION FILED JUNE 14, 1920.
1,392,987.
Patented Oct. 11, 1921.
2 SHEETS—SHEET 1.
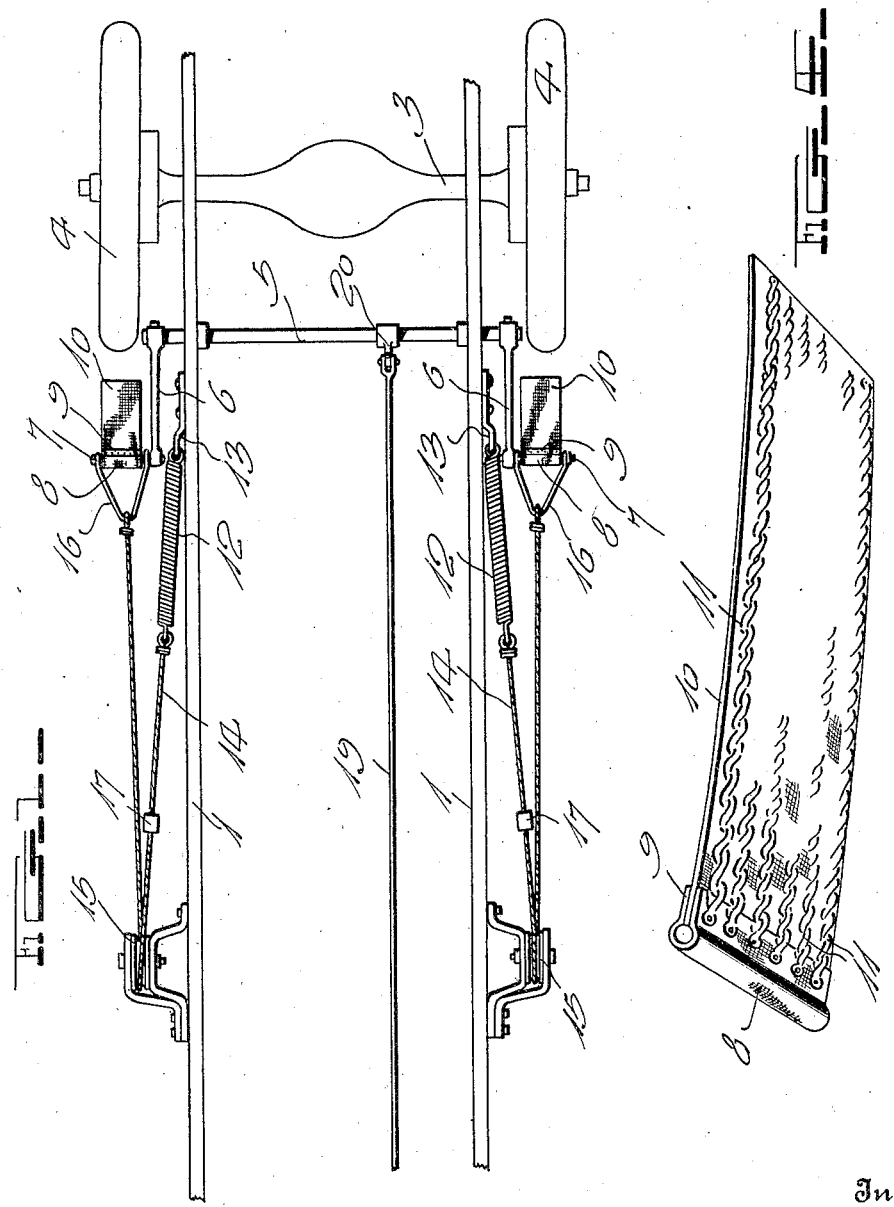
Witness
H. Woodard
Inventor
A. A. Unruh
By H. B. Willson & Co.
Attorneys

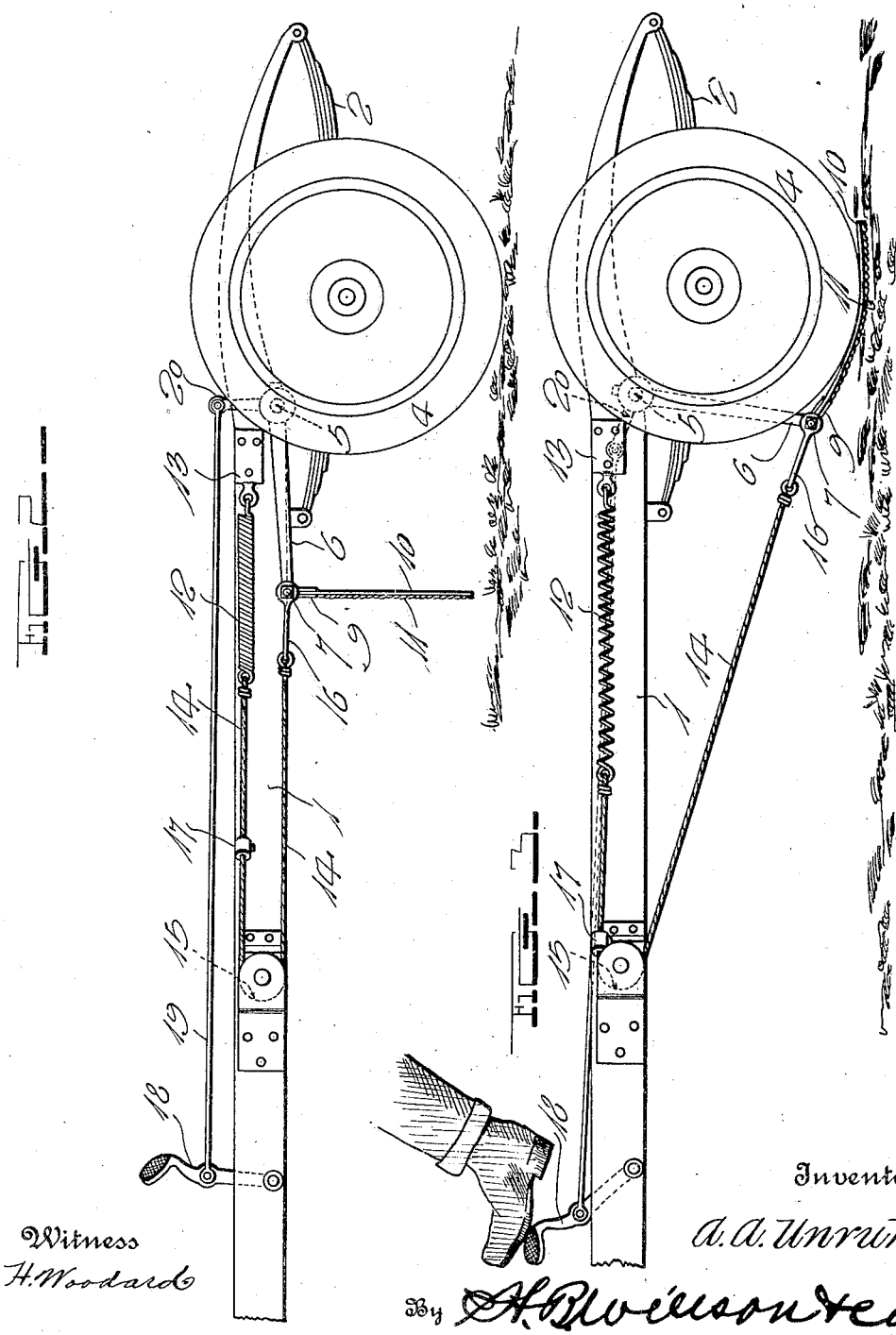

UNITED STATES PATENT OFFICE.

ALBERT A. UNRUH, OF SALEM, OREGON.

AUTOMOBILE-BRAKE.

1,392,987.  Specification of Letters Patent.  Patented Oct. 11, 1921.

Application filed June 14, 1920. Serial No. 388,958.

*To all whom it may concern:*

Be it known that I, ALBERT A. UNRUH, a citizen of the United States, residing at Salem, in the county of Marion and State of Oregon, have invented certain new and useful Improvements in Automobile-Brakes; and I do declare the following to be a full, clear, and exact description of the invention, such as will enable others skilled in the art to which it appertains to make and use the same.

This invention relates to an improved automobile brake and one object of the invention is to provide a brake which may be used as an emergency brake and will serve to bring the automobile to a stop very rapidly, the brake including mats which will be positioned upon the ground beneath the driving wheels when in an operative position thus preventing the driving wheels from engaging the ground and driving the car forwardly.

Another object of the invention is to so construct the brake that the same may be moved into engagement with the ground at the same time and thus permit both of the driving wheels to be moved out of engagement with the ground.

Another object of the invention is to provide an improved means for carrying the mats and to so construct the mat carrying structure that it may be moved to a lowered or operative position by pressure upon the foot treadle.

Another object of the invention is to so construct the brake that the same may be connected with an automobile chassis of a conventional construction thus making it unnecessary to provide any special construction of chassis in order to permit this device to be used.

Another object of the invention is to so construct the wheel engaging mats that they will be protected from wear by dragging upon the ground beneath the wheels, and thus the mats prevented from being quickly worn out.

This invention is illustrated in the accompanying drawings, wherein:—

Figure 1 is a top plan view of a chassis showing the improved brake structure employed, Fig. 2 is a side elevation of the structure shown in Fig. 1 with the brake structure in a raised or inoperative position, Fig. 3 is a view similar to Fig. 2 showing the brake structure in a lowered or operative position, and Fig. 4 is a perspective view of one of the mats.

This brake is used in connection with an automobile having an ordinary construction and having its chassis provided with side rails 1 which carry springs 2, the springs resting upon the axle casing 3 through which extends the axle having the wheels 4 carried thereby. It will thus be seen that the chassis of a conventional construction and that it does not require any special construction of chassis in order to permit the improved brake to be used. This brake is provided with a rocker shaft 5 which extends transversely of the chassis and has its outer end portion provided with forwardly extending arms 6. The arms 6 are provided with outstanding side pins 7 which pass through the sleeves 8 which are formed from the binding strips 9 of the mats 10 and it will thus be seen that the mats will be pivotally supported so that they may swing from the vertical position shown in Fig. 2 to the position shown in Fig. 3. Protecting chains 11 are provided for the mats and extend longitudinally of the mats as shown in Fig. 4 so that when this device is in use, the chains will engage the ground instead of the underface of the mat and thus the mats will be protected from excessive wearing due to their dragging along the ground.

In order to normally retain the brake in the inoperative position shown in Fig. 2 there has been provided springs 12 which are connected with brackets 13 secured to the side rails of the chassis and these springs are connected with lines 14 which extend over guide pulleys 15 and are connected with the bridles 16 mounted upon the pins 7. Blocks 17 are placed upon the lines 14 and limit the passage of the lines through the pulley housings so that when the device is in use the mats will be prevented from moving beneath the wheels beyond the position shown in Fig. 3.

When this device is in use it is mounted as shown and if the driver of the automobile sees that he is about to have a collision or if for any other reason it is necessary for him to stop very quickly, he will place his foot upon the treadle 18 and press this treadle downwardly, thus drawing upon the rod 19 which leads back to the lever 20. This will move the lever to rotate the sprocket shaft 5 and swing the arm 6 downwardly into engagement with the ground. The free end portions of the mats will pass beneath the rear driving wheels 4 thus lifting them off of the ground and causing the wheels to drag with the mats protecting the tires and preventing the tires from being worn out. The machine will, therefore, very quickly come to a stop and a collision will be prevented. When it is desired to again move forwardly, the automobile must be backed a sufficient distance for the wheels 4 to move off of the mats and the springs 12 will return the brake mechanism to the inoperative position shown. It will thus be seen that there has been provided an automobile brake structure so constructed that a stop can be very quickly made and further so constructed that it will be very efficient in operation and so constructed that it may be readily applied to a conventional type of automobile chassis.

What is claimed is:

1. The combination with a chassis having side beams, a rocker shaft extending transversely of the chassis and rotatably connected with the side beams, arms extending forwardly from the rocker shaft and having outstanding pins, mats pivotally mounted upon the pins and having protecting chains extending longitudinally of their underfaces, springs connected with the side beams, guides connected with the side beams, lines connected with the springs and extending about the guides and connected with the pins, and means for rotating the rocker shaft to swing the arms downwardly against the action of the springs and bring the mats into engagement with the ground for passing beneath the wheels.

2. A brake structure comprising a rocker shaft for extending transversely of a chassis in front of the driving wheels, arms extending forwardly from the rocker shaft, pins extending from the front end portions of the arms, mats carried by the pins for engaging the ground and extending beneath the driving wheels, protecting chains extending longitudinally of the mats, means connected with the pins for yieldably retaining the arms in an elevated position, and means for rotating the rocker shaft to swing the arms downwardly.

3. A brake structure comprising a rocker shaft for extending transversely of a chassis, arms extending from the rocker shaft and having outstanding pins, mats for extending beneath the driving wheels, bindings for the mats bent to provide pin receiving sleeves to pivotally connect the mats with the pins, protecting chains extending longitudinally of the mats, means for yieldably retaining the brake structure in an inoperative position, and means for moving the brake structure to an operative position.

4. In a brake structure, a mat for extending beneath a wheel, a sleeve extending transversely of the mat and connected with one end thereof, and protecting chains extending longitudinally of the mat along the under face thereof.

In testimony whereof I have hereunto set my hand in the presence of a subscribing witness.

ALBERT A. UNRUH.

Witness:
G. E. UNRUH.